(12) United States Patent
Sommer et al.

(10) Patent No.: US 7,618,508 B2
(45) Date of Patent: Nov. 17, 2009

(54) LAMINATE AND A METHOD FOR PRODUCING A LAMINATE CONSISTING OF AT LEAST THREE LAYERS

(75) Inventors: Sebastian Sommer, Troisdorf (DE); Detlef Frey, Niederikassel (DE); Jens Guedden, Troisdorf (DE)

(73) Assignee: Reifenhaeuser GmbH & Co. KG Maschinenfabrik, Troisdorf (DE)

( * ) Notice: Subject to any disclaimer, the term of this patent is extended or adjusted under 35 U.S.C. 154(b) by 68 days.

(21) Appl. No.: 11/284,840

(22) Filed: Nov. 23, 2005

(65) Prior Publication Data
US 2006/0135025 A1    Jun. 22, 2006

(30) Foreign Application Priority Data
Nov. 23, 2004    (EP)    ................... 04027801

(51) Int. Cl.
*B32B 27/12*    (2006.01)
*D04H 3/10*    (2006.01)
*D04H 3/14*    (2006.01)

(52) U.S. Cl. .................. 156/148; 156/167; 156/179; 156/244.11; 28/107; 442/394; 442/402

(58) Field of Classification Search .............. 156/167, 156/179, 308.2, 148, 244.11; 442/394, 398, 442/401, 402, 409; 28/107, 110, 112, 115
See application file for complete search history.

(56) References Cited

U.S. PATENT DOCUMENTS

| | | | | |
|---|---|---|---|---|
| 2,893,105 A | * | 7/1959 | Lauterbach | ................ 28/112 |
| 3,692,618 A | * | 9/1972 | Dorschner et al. | .......... 442/401 |
| 4,125,663 A | * | 11/1978 | Eckardt | ................ 442/401 |
| 4,582,750 A | * | 4/1986 | Lou et al. | ................ 442/414 |
| 5,151,320 A | | 9/1992 | Homonoff et al. | |
| 5,597,645 A | * | 1/1997 | Pike et al. | ................ 96/99 |
| 5,622,772 A | * | 4/1997 | Stokes et al. | ................ 442/401 |
| 6,258,308 B1 | * | 7/2001 | Brady et al. | .......... 264/210.2 |
| 6,383,623 B1 | * | 5/2002 | Erb, Jr. | ................ 428/299.7 |
| 6,649,548 B1 | | 11/2003 | Shawver et al. | |

FOREIGN PATENT DOCUMENTS

| | | |
|---|---|---|
| EP | 0 989 222 A1 | 3/2000 |
| EP | 1 375 132 A1 | 1/2004 |
| EP | 1 445 366 A2 | 8/2004 |
| WO | WO 02/29146 A1 | 4/2002 |
| WO | WO 02/098653 A1 | 12/2002 |

* cited by examiner

*Primary Examiner*—Michael A Tolin
(74) *Attorney, Agent, or Firm*—Andrew Wilford

(57) ABSTRACT

A laminate consisting of at least three layers, one layer of the laminate being formed by at least one nonwoven web made from continuous filaments. This is a nonwoven web thermally hardened by means of the effect of a hot fluid. A further layer of the laminate is disposed both on the upper side and on the lower side of the nonwoven web and connected securely to the nonwoven web.

3 Claims, 1 Drawing Sheet

LAMINATE AND A METHOD FOR PRODUCING A LAMINATE CONSISTING OF AT LEAST THREE LAYERS

BACKGROUND OF THE INVENTION

1. Field of Invention

The invention relates to a laminate consisting of at least three layers, one layer of this laminate being formed from at least one nonwoven web made from continuous filaments. Furthermore, the invention relates to a method for producing a laminate consisting of at least three layers.—It is within the framework of the invention that the continuous filaments are made from a thermoplastic synthetic. In the following, the continuous filaments are also referred to as filaments. The continuous filaments are produced by means of a spinning device and in the form of a tangled fleece on a surface. The tangled fleece or nonwoven web is then generally hardened.

2. Description of Related Art

Laminates of the type specified above are known in practice in different embodiments with which one layer is formed by a nonwoven web. The nonwoven web can for example be covered with a film. The nonwoven webs used for this type of laminate are generally hardened by intensive calendering. With these intensive hardening measures, the thickness of the nonwoven web is generally reduced to a relatively high degree. In this way nonwoven webs or laminates with nonwoven webs are produced the flexural rigidity of which leaves a lot to be desired. With these known laminates with nonwoven webs, a high level of flexural rigidity is also not necessarily intended.—The known laminates made from a nonwoven web and a film have further disadvantages however. Due to the intensive calendering of the nonwoven web, indentations appear in the corresponding nonwoven web surface due to the effect of the calender points, and so a rough topology results. If for example a film is then to be adhesively bonded onto this nonwoven web surface, an undesirably large amount of adhesive is used in order to fill in the unevennesses in the nonwoven web surface, or the film is only adhesively bonded onto part of the nonwoven web surface so that a relatively weak connection results between the film and the nonwoven web. If, on the other hand, the film is to be applied within the framework of a molten coating over the uneven nonwoven web surface, this leads to a profiled or rough outer surface of the applied film so that the resulting laminate leaves a lot to be desired with regard to the aesthetic appearance. Moreover, due to the rough or profiled surface of the laminate, subsequent printability is made more difficult.

SUMMARY OF THE INVENTION

On the other hand, the technical problem which forms the basis of the invention is to provide a laminate of the type specified at the start with which the layers are on the one hand effective, and securely connected to one another, and which moreover are characterised by a high surface quality and an optimal aesthetic appearance, and which furthermore has a high level of flexural rigidity. Another technical problem which forms the basis of the invention is a method for producing this type of laminate consisting of at least three layers.

In order to solve this technical problem, the invention proposes a laminate consisting of at least three layers, one layer of the laminate being formed by at least one nonwoven web made from continuous filaments, this being a nonwoven web which has been thermally hardened by the effect of a hot fluid, a film being disposed both on the upper side and on the lower side of the nonwoven web, and the films being securely connected to the nonwoven web by means of an adhesive bond or by means of a molten coating.—According to a much preferred embodiment, the thermal hardening of the nonwoven web with the hot fluid is implemented by hot air hardening.

A preferred embodiment of the invention is characterised in that hardening of the nonwoven web is implemented exclusively as thermal hardening by means of hot fluid or by means of hot air, and that there is no pre-hardening by means of calendering and/or needling. It is however within the framework of the invention that the nonwoven web specified for the laminate is calendered to a slight or small extent, or needled to a slight or small extent prior to the thermal hardening. This is explained in greater detail below.

BRIEF DESCRIPTION OF THE DRAWINGS

The invention will be described with reference to the following drawing wherein.

DETAILED DESCRIPTION OF PREFERRED EMBODIMENTS

Figure 1:
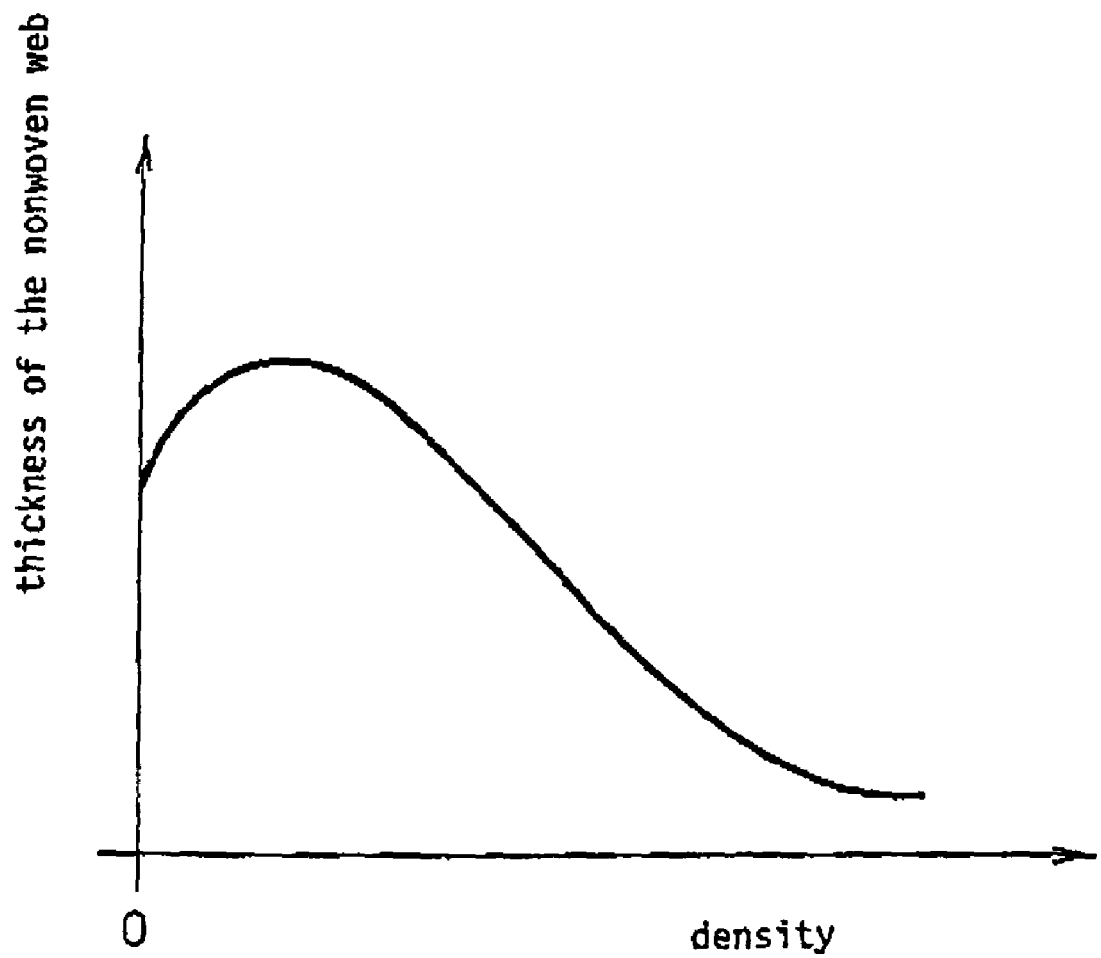
FIG. 1 is a graph showing the connection between the resulting thickness of the nonwoven web following mechanical needling and the needling density.

One embodiment of the invention is characterised in that a three-layer or three-tier laminate is provided, the middle layer of which is formed by the nonwoven web, and the two outer layers of which are each formed by a film. According to a particularly preferred embodiment of the invention, a film or films made from thermoplastic synthetic are used. Advantageously, two films made from thermoplastic synthetic are provided for the laminate according to the invention, one of these films being attached to the upper side, and the other to the lower side of the nonwoven web. It is within the framework of the invention that these are extruded synthetic films which are produced, for example, with an appropriate wide slit tool. Preferably, at least one synthetic film connected to the nonwoven web, preferably two synthetic films attached on both sides to the nonwoven web consist at least 50% by weight of a synthetic from which the nonwoven web filaments are also made. According to a particularly preferred embodiment, at least 50% by weight and preferably at least 60% by weight of the whole laminate is made from just one synthetic, for example polypropylene. Further components of the laminate can then be in particular mineral components which are found especially in the further layers adjoining the nonwoven web. If synthetic films adjoin the nonwoven web, these films contain for example calcium carbonate.

According to the invention, the films preferably directly adjoining the nonwoven web are connected securely to the nonwoven web by means of an adhesive bond or in the form of a molten coating. Within the framework of the invention, connected securely to the nonwoven web means that the film is not disposed loosely on the nonwoven web and can not be released from the nonwoven web easily or without a great deal of force. If a film or films is/are attached to the nonwoven web by means of an adhesive bond, it is advantageous to use a hotmelt adhesive. It is within the framework of the invention that a hotmelt adhesive bond is realised between the nonwoven web and a film directly adjoining the same. As already explained above, it is also within the framework of the invention that the film or the films are attached to the nonwoven web within the framework of a molten coating. A film or the two films are then applied to the nonwoven web as a molten mass or in molten fluid form.

In order to solve the technical problem, the invention furthermore proposes a method for producing a laminate consisting of at least three layers, continuous filaments first of all being produced with a spinning device and being deposited as a tangled fleece or nonwoven web onto a surface, thermal hardening of the deposited tangled fleece or nonwoven web furthermore being implemented by means of a hot fluid, this thermal hardening of the nonwoven web being implemented such that the thickness of the nonwoven web following the thermal hardening is at least 40% of the thickness of the nonwoven web prior to the thermal hardening, and afterwards the thermally hardened nonwoven web being connected securely both on its upper side and on its lower side to a film. The term "secure connection" has already been defined above.

If, within the framework of the method according to the invention, the thermal hardening of the nonwoven web takes place without a small degree of pre-hardening, this thermal hardening of the nonwoven web is implemented such that the thickness of the nonwoven web following the thermal hardening is at least 40%, preferably at least 50%, more preferably at least 60% and very preferably at least 70% of the thickness of the nonwoven web prior to the thermal hardening. If a small degree of pre-hardening takes place prior to the thermal hardening by means of a small degree of calendering or a small degree of needling, the thermal hardening of the nonwoven web is implemented such that the thickness of the nonwoven web following the thermal hardening is at least 50%, preferably at least 60%, more preferably 70%, and very preferably at least 80% of the thickness of the nonwoven web following the small degree of pre-hardening and prior to the thermal hardening.—Within the framework of the invention, thickness of the nonwoven web means the extension of the nonwoven web or of the length of fleece at right angles to the face or surface of the nonwoven web or at right angles to the laminar surface for the length of fleece.

According to the invention, the nonwoven web is therefore hardened and finally hardened using a hot fluid medium, in particular using hot air. Hardening here means thermal bonding of the nonwoven web or the filaments of the nonwoven web. For this, the hot fluid medium advantageously flows through the nonwoven web. Preferably, a hot air oven is used as a hardening device or a thermal bonding device, in particular in the form of a drum drier. It is therefore within the framework of the invention that the hardening takes place in a hot air hardening drier.

As already expressed above, it is within the framework of the invention that the hardening is implemented with the hot fluid medium such that the thickness of the nonwoven web is not or not substantially reduced. For this, the length of time over which the hot fluid medium takes effect and/or the temperature of the hot fluid medium and/or the quantity of the effective hot fluid medium is preferably set correspondingly. According to a very preferred embodiment of the invention, the thermal hardening is therefore at the same time implemented with very great care so that the thickness of the nonwoven web is maintained as far as possible. It is within the framework of the invention that the thermal hardening is implemented at a hardening temperature which lies between the softening temperature and the melting temperature of the filament synthetic. Filament synthetic means the synthetic from which the filaments are made. Thermal bonding of the nonwoven web and the filaments is implemented within the specified temperature range. In this respect, this hardening differs from thermal fixing with which lower temperatures are sufficient. Particularly preferred is an embodiment according to the invention with which part of the filaments in the nonwoven web temporarily reach their fusing temperature. In this way one achieves an effective connection between adjacent filaments.—If fibre mixtures and/or bi-component filaments or multi-component filaments are used for the nonwoven web, the hardening temperature described above is determined by the lowest melting synthetic or with bi-component or multi-component filaments by the lowest melting synthetic in the filament surface.

According to one embodiment of the invention, the nonwoven web is not only exclusively thermally hardened, but pre-hardened to a slight or small degree prior to the final thermal hardening. By means of this slight pre-hardening the nonwoven web should be stabilised for conveyance to the thermal hardening and stabilised to withstand forces, in particular aerodynamic forces, acting upon the nonwoven web during the thermal hardening.—According to a first variation, the slight pre-hardening takes place by means of a small degree of calendering. A small degree of calendering means calendering which, compared with the conventional calendering of a predetermined nonwoven web, is implemented at a reduced temperature of the calender rolls and/or with reduced contact pressure or linear load of the calender rolls. With a small degree of calendering, filaments near to the surface of the nonwoven web are substantially connected to one another. Advantageously, the calendering is implemented such that the filaments which are connected to one another following the calendering were disposed 80%, and preferably at least 90% in the upper and lower fifth of the nonwoven web (relative to the thickness of the nonwoven web) prior to calendering.

It is within the framework of the invention that the small degree of calendering is implemented such that the slightly calendered nonwoven web has a maximum tensile strength which is less than 50%, and preferably max. 45% of the max. achievable tensile strength for this nonwoven web. The max. tensile strength is defined in DIN 53816. Within the framework of the invention, max. tensile strength means the max. tensile strength which is the max. achievable with the corresponding calender under the same conditions (fleece properties, fleece deposit, production speed etc.), just with variation of the contact pressure and/or the temperature of the calender rolls. The max. tensile strength of the nonwoven web set according to the invention is given in particular as follows. The contact pressure and/or the temperature of the calender or the calender rolls is at first varied such that the max. and highest possible max. tensile strength for the calendered nonwoven web is given. This is therefore the highest possible max. tensile strength for the pre-specified nonwoven web with max. hardening by calendering. In order to then set a value according to the invention of less than 50% or of max. 45% of the max. highest tensile strength, under conditions which are otherwise the same (as when determining the max. highest tensile strength), the contact pressure and/or the temperature of the calender and the calender rolls is advantageously changed until the value of the max. tensile strength according to the invention is reached.

It is within the framework of the invention that the small degree of calendering is implemented such that the thickness of the slightly calendered nonwoven web is at least 50%, preferably at least 60%, and more preferably at least 70% of the thickness of the nonwoven web prior to the small degree of calendering. According to a particularly preferred embodiment of the invention, the small degree of calendering is implemented such that the thickness of the slightly calendered nonwoven web is at least 75%, preferably at least 80%, and more preferably at least 85% of the thickness of the nonwoven web prior to the small degree of calendering. The thickness of the nonwoven web prior to the small degree of calendering means the thickness of the nonwoven web directly before being fed into the calender or into the calendering device. It is within the framework of the invention here that the nonwoven web has previously, i.e. after its deposit, passed an outlet mating roll.—The conditions for the small degree of calendering are therefore chosen such that the thickness of the nonwoven web is not substantially reduced. This happens in particular by setting the temperature and/or the contact pressure of the calender rolls correspondingly and/or by a corresponding selection of the size of the stamping surface of the calender rolls and/or by selecting the stamping pattern of the calender rolls. According to a particularly preferred embodiment, the temperature of the calender rolls falls within a temperature range of between 50° C. below the melting point of the filament synthetic and the melting point of the filament synthetic. If a fibre mixture is being used or if bi-component filaments or multi-component filaments are being used, the aforementioned temperature range depends upon the lowest melting synthetic or with bi-component filaments/multi-component filaments upon the melting point of the lowest melting filament synthetic in the filament surface.—Within the framework of the invention, the calender temperature means the surface temperature determined for the calender rolls. According to a preferred embodiment of the invention, a linear load of the calender rolls between 10 and 120 daN/cm, and preferably between 20 and 60 daN/cm, is set for the small degree of calendering. Advantageously, the calender has a stamping surface of between 3 and 35%, and preferably between 5 and 20%.—If a high calender temperature is set for the small degree of calendering, it goes without saying that the contact pressure and the linear load of the calender rolls is set correspondingly lower. If, on the other hand, a high contact pressure or linear load is set for the calender rolls for the small degree of calendering, it goes without saying that the calender roll temperature is then chosen to be correspondingly lower.

According to a further second variation of the invention, the nonwoven web is not exclusively thermally hardened either, but is pre-hardened prior to the final thermal hardening by means of a small degree of mechanical needling or by means of a small degree of hydrodynamic needling. The small degree of mechanical needling is very preferably implemented. Mechanical needling is implemented using a number or a large number of needles which are normally disposed on a needle beam or on needle beams. In this respect mechanical needling differs from hydrodynamic needling with which one works with jets of water. It is within the framework of the invention that pre-hardening of the nonwoven web only takes place by means of a small degree of needling, and then the final thermal hardening is implemented with the hot fluid. Calendering or a small degree of calendering of the nonwoven web does not therefore then take place. Within the framework of the invention, a small degree of needling means less intensive needling of the nonwoven web than with conventional needling methods such that the thickness of the nonwoven web is maintained as far as possible following the small degree of needling or is not reduced or (as described in more detail below), according to a much preferred embodiment, is increased.

It is within the framework of the invention that the small degree of mechanical or hydrodynamic needling is implemented such that the thickness of the mechanically needled nonwoven web is at least 60%, preferably at least 75%, more preferably at least 85%, and very preferably at least 90% of the thickness of the nonwoven web prior to the small degree of needling. According to a particularly preferred embodiment of the invention, the thickness of the mechanically needled nonwoven web is more than 95% of the thickness of the nonwoven web prior to the small degree of needling. With the thickness of the nonwoven web prior to the small degree of needling, one means the thickness of the nonwoven web directly prior to being fed into the needling device. It is within the framework of the invention here that the nonwoven web has previously, i.e. after its deposit, passed an outlet mating roll.—With the small degree of needling a lowest possible thickness reduction, preferably no thickness reduction at all, and very preferably an increase in thickness of the nonwoven web should therefore be achieved. As already described above, according to a much preferred embodiment, a small degree of mechanical needling takes place.

An increase in thickness is realised by the small degree of mechanical needling of the nonwoven web in that needles plunging into the nonwoven web engage with filaments and shift these filaments at right angles to the fleece surface and then push them out of the fleece surface lying opposite the surface into which the needles plunge. In this way the crossways extension and the thickness of the nonwoven web is increased. This effect can only be realised if only slight or non-intensive needling takes place, and in particular if one works with a small needling density. The needles for the mechanical needling of nonwoven webs often have a number of indents which are each in the position to take up filaments at the same time and to shift them at right angles to the fleece surface. The indents are therefore take-up elements for the filaments. The needling density is given as the number of the indents or take-up elements encountered by the product per $cm^2$ of the nonwoven web face or surface. If a needle only has one indent or only one take-up element, the needling density then corresponds to the number of needle insertions per $cm^2$ of the nonwoven web face or surface. According to a particularly preferred embodiment of the invention, mechanical needling is implemented with a needling density of $30/cm^2$ to $360/cm^2$, preferably $100/cm^2$ to $300/cm^2$, and very preferably $150/cm^2$ to $240/cm^2$.

Moreover, the single FIGURE shows the connection between the resulting thickness of the nonwoven web following mechanical needling and the needling density. It can be seen that with small needling densities an increase of the nonwoven web thickness can also basically be achieved in comparison to the original nonwoven web thickness (nonwoven web thickness with the needling density 0). With greater needling densities and with correspondingly more intensive mechanical needling, it is no longer possible to increase the thickness in this way. Rather with a greater needling density and intensive mechanical needling, the thickness of the nonwoven web is reduced.

According to a much preferred embodiment of the invention, with the small degree of mechanical needling one preferably works with a needling depth of between 2 and 15 mm, preferably between 5 and 12 mm, and very preferably between 7 and 11 mm. The needling depth corresponds to the maximum length by which the needle emerges from the fleece surface lying opposite the surface into which the needles are plunged (distance of the needle point from this opposite surface). The mechanical needling can be implemented from the upper side of the nonwoven web or from the lower side of the nonwoven web. According to a much preferred embodiment of the invention, the mechanical needling is implemented from both sides, i.e. from the upper side and from the lower side of the nonwoven web.—Moreover, the nonwoven web thickness is measured according to DIN EN 29703 part 2.

A preferred embodiment of the method according to the invention is characterised in that at least one of the further layers to be connected to the thermally hardened nonwoven web is a film made from thermoplastic synthetic which is applied to the nonwoven web within the framework of a molten coating. Preferably, both of the further layers to be connected to the thermally hardened nonwoven web are films made from thermoplastic synthetic which are applied to the nonwoven web from both sides within the framework of this type of molten coating.

According to another embodiment of the invention, at least one of the further layers to be connected to the thermally hardened nonwoven web is a film made from thermoplastic synthetic which is adhesively bonded onto the nonwoven web by means of an adhesive, preferably by means of a hotmelt adhesive. Within the framework of this embodiment both of the further layers to be connected to the thermally hardened nonwoven web are advantageously films made from thermoplastic synthetic which are adhesively bonded onto the nonwoven web by means of an adhesive, preferably by means of a hotmelt adhesive.

It is also within the framework of the invention that a film made from thermoplastic synthetic is applied from one side onto the nonwoven web within the framework of a molten coating and that a film made from thermoplastic synthetic is adhesively bonded onto the nonwoven web on the other opposite side of the nonwoven web by means of an adhesive, preferably by means of a hotmelt adhesive.—According to a preferred embodiment of the invention the film to be applied to the nonwoven web is a one-layered film. However, it is also within the framework of the invention that this foil can be a laminate made from a number of foils.

The invention is first of all based upon the knowledge that by means of the treatment measures according to the invention, i.e. by means of the small degree of and very careful pre-hardening of the nonwoven web and the final thermal hardening with the hot fluid it is possible for the continuous filaments in the hardened fleece to be orientated substantially parallel to the face or surface of the nonwoven web. Moreover, the invention is based upon the knowledge that due to the treatment measures according to the invention, a large fleece thickness can be maintained. These aforementioned properties lead to a surprisingly high level of flexural rigidity of the laminate according to the invention. Moreover, with the treatment of the nonwoven web according to the invention, very even and level nonwoven web surfaces are obtained. When coating these nonwoven web surfaces it is then guaranteed that the coatings, for example films which are applied, are also very even and smooth, and undesirable profiles or undesirable roughness do not occur. The laminate therefore suffices for all requirements with regard to its external appearance and with regard to aesthetics. In this respect there are considerable advantages in comparison to laminates known from the prior art.

What is claimed is:

1. A method of producing a three-layer laminate, the method comprising the steps of:
   producing initially continuous filaments by means of a spinning device;
   depositing the filaments as a nonwoven web on a depositing unit;
   preconsolidating the nonwoven web by light mechanical needling so that an increase in the thickness of the nonwoven web is achieved;
   thermally consolidating the nonwoven web by means of a hot fluid such that the thickness of the nonwoven web after the thermal consolidation is at least 70% of the thickness of the nonwoven web before the thermal consolidation;
   adhesively bonding a thermoplastic film to one side of the consolidated nonwoven web; and
   molten coating another thermoplastic film to an opposite side of the consolidated nonwoven web.

2. The method according to claim 1, wherein the film is adhesively bonded to the one side of nonwoven web by means of a hot melt adhesive.

3. A method of producing a three-layer laminate, the method comprising the steps of:
   producing initially continuous filaments of a predetermined plastic by means of a spinning device;
   depositing the filaments as a nonwoven web on a depositing unit;
   preconsolidating the nonwoven web by light mechanical needling so that an increase in the thickness of the nonwoven web is achieved;
   thermally consolidating the nonwoven web by means of a hot fluid such that the thickness of the nonwoven web after the thermal consolidation is at least 70% of the thickness of the nonwoven web before the thermal consolidation;
   adhesively bonding a thermoplastic film to one side of the consolidated nonwoven web; and
   molten coating another thermoplastic film to an opposite side of the consolidated nonwoven web, both of the films consisting at least 50% of the predetermined plastic forming the filaments.

* * * * *